July 6, 1965  G. GREENBAUM  3,192,681
METHOD OF FORMING BLISTER TYPE PACKAGES
Filed Nov. 1, 1961  3 Sheets-Sheet 1
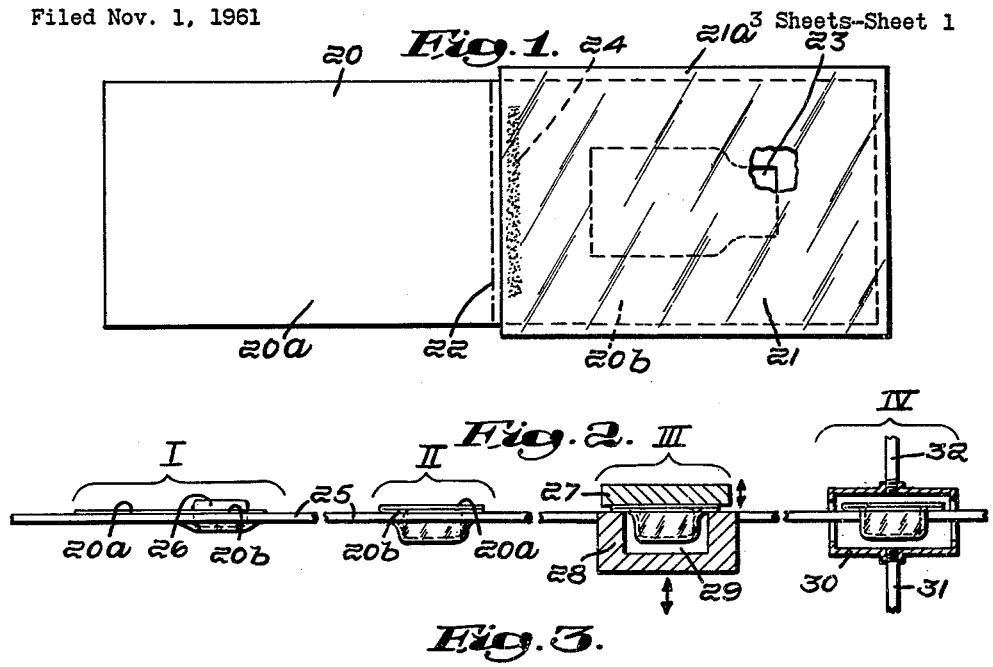
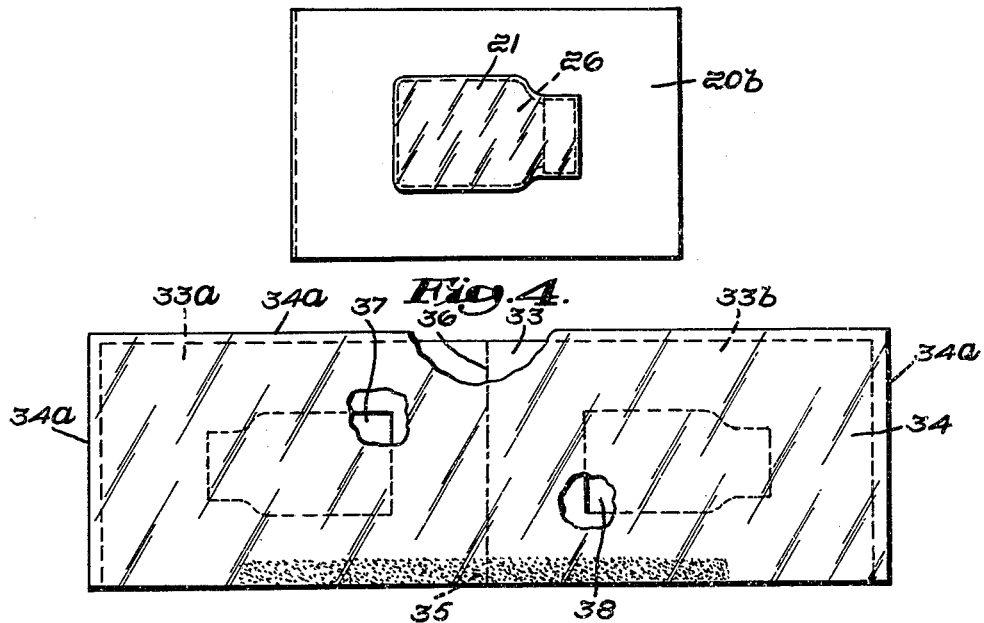
Inventor:
George Greenbaum
by Arthur D. Thomson
Attorney

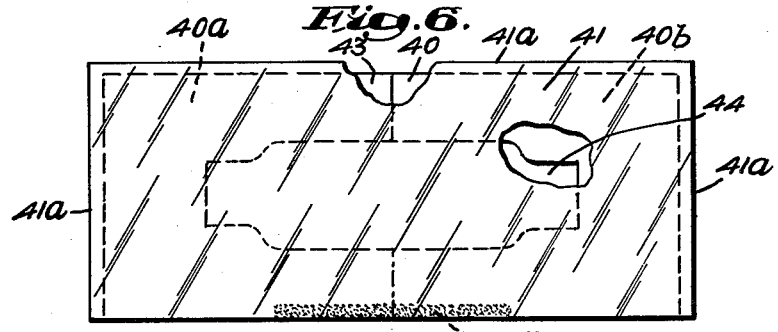
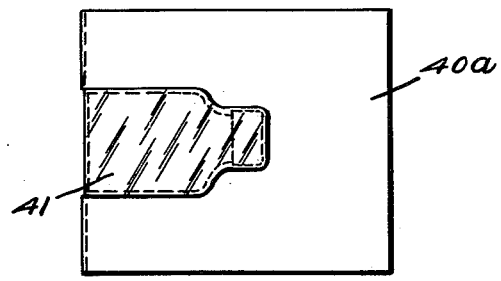
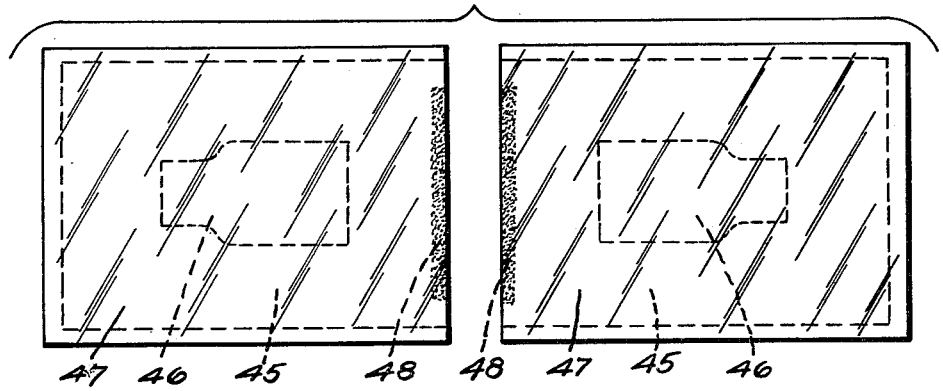

July 6, 1965  G. GREENBAUM  3,192,681
METHOD OF FORMING BLISTER TYPE PACKAGES
Filed Nov. 1, 1961  3 Sheets-Sheet 3
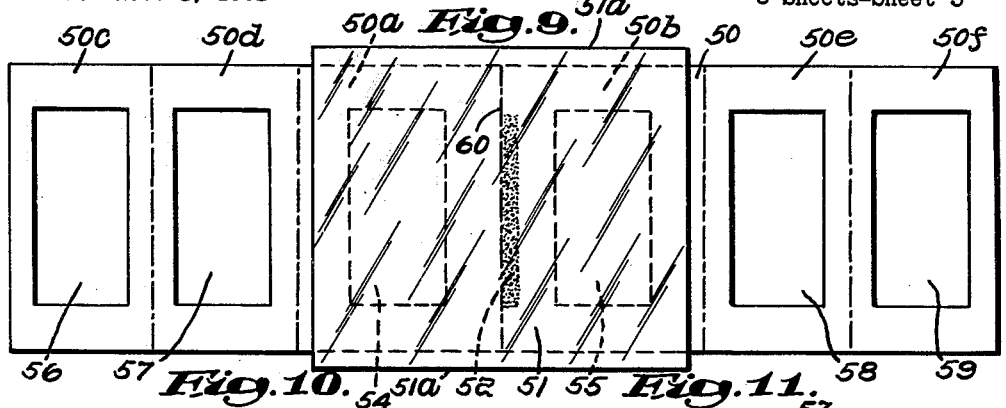
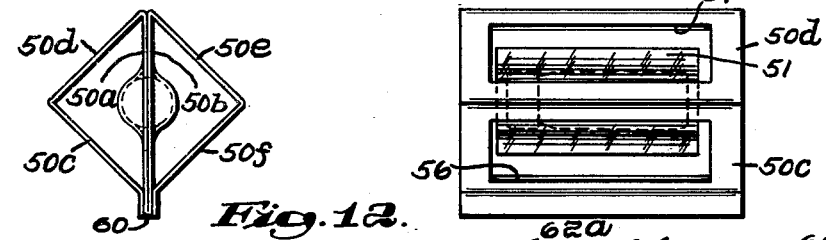
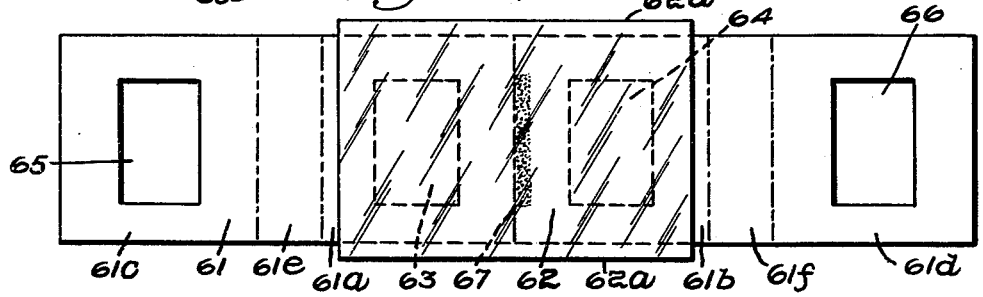
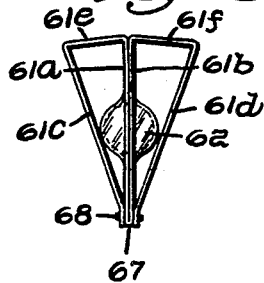
Inventor:
George Greenbaum,
by Arthur D. Thomson
Attorney

3,192,681
METHOD OF FORMING BLISTER TYPE PACKAGES
George Greenbaum, Brookline, Mass.
(% Linvure Co., 169 A St., Boston 10, Mass.)
Filed Nov. 1, 1961, Ser. No. 149,464
3 Claims. (Cl. 53—30)

This invention relates to packaging and more particularly to making a "blister" type of package in which an article is wholly or partly encased in a formed container or blister of transparent material mounted on a stiff card or backer.

According to the customary method of making blister packages, the blister, which is made of a transparent rigid plastic such as polyvinyl chloride or polyvinyl acetate, is molded in a die of the desired shape by vacuum drawing or other customary techniques for molding plastic articles and the preformed blister is then filled and assembled into the package. Molding dies are expensive and, as the blisters are ordinarily formed to approximately the contour of a particular article, special dies are required for each type of article to be packaged. It is also customary to insert the article and attach the filled blister onto the card or backer by means of automatic machinery. This machinery must be supplied with holders and attaching device shaped to accommodate the particular blister. Furthermore, the blister must be made with a fairly thick wall to withstand the necessary handling in the packaging process. Another method of packaging is to wrap or drape the article in a transparent wrapper and secure it to a backer, but this type of package does not have as neat and smooth an appearance as a molded blister especially when used on an article of irregular shape, because the sheet is creased and overlapped in places.

The principal object of this invention is to provide a method of producing a blister type of package in which the transparent covering is smoothly and closely fitted to the article, giving substantially the appearance of a pre-molded blister, without the use of special forming dies, and at greatly reduced cost. Another object is to provide a method for forming such a package, which is adaptable for packaging articles of various types manually, semi-automatically, or by means of fully automatic machinery.

According to the new method here described, a film of transparent material, having the property of shrinking substantially uniformly in all directions when subjected to heat, is placed over a stiff backer having an opening of suitable size and shape to accommodate the article to be wrapped. The article is laid over the opening and a portion of the backer folded over and secured around the article in such a manner that the article is pushed through the opening along with a covering of the transparent material. The package is then heated so that the film shrinks and molds itself to the contour of the article. Other objects, advantages, and novel features of the invention will be apparent from the following more detailed description.

In the drawings illustrating the invention:

FIG. 1 is a plan view of a blank for forming a package according to the invention;

FIG. 2 is a schematic illustration of the steps required for forming the package;

FIG. 3 is a plan view of a completed package made from the blank of FIG. 1;

FIG. 4 is a plan view of a modified form of blank;

FIG. 5 is a side view of a package made from the blank of FIG. 4;

FIG. 6 is a plan view of a modified form of blank;

FIG. 7 is a plan view of a package made from the blank of FIG. 6;

FIG. 8 is a plan view of a variation of the blank for forming a package similar to that shown in FIG. 5;

FIG. 9 is a plan view of a form of blank especially suitable for packaging fragile articles;

FIG. 10 is an end view of a package made from the blank of FIG. 9;

FIG. 11 is a side view of a package made from the blank of FIG. 9;

FIG. 12 is a plan view of another form of blank for packaging fragile articles;

FIG. 13 is an end view of a package made from the blank of FIG. 12; and

FIG. 14 is a side view of the package shown in FIG. 13.

The blank shown in FIG. 1 consists of a backer 20, made of stiff paper, cardboard, paper board or similar material, and sheet 21 of heat shrinkable transparent material, such as biaxially orientated polyvinyl chloride or polypropylene, or polystyrene film. This material will shrink in all directions when heated. The film is preferably about .0004 to .001 inch thick.

The backer 20 is rectangular and is scored down the middle along line 22, dividing it into two portions 20a and 20b, and has a cut out opening 23 to one side of the score line. The opening is preferably shaped to the outline of the particular object to be packaged, for example a bottle, and is large enough to provide a little clearance all around. The sheet 21, which is also rectangular is secured to the backer by a strip of adhesive 24 along one side and has margins 21a on its other three sides extending beyond the corresponding edges of the backer.

To assemble the package, the blank is preferably placed for convenience with sheet 21 on top, on a support 25 such as a table or conveyor belt, having an opening large enough to accommodate the article to be packaged. Step I consists of laying the article 26 on the blank in register with opening 23. Step II consists of folding the backer along line 22, so that portion 20a lies flat on portion 20b. The article is pushed through opening 23 in the folding process, carrying the central part of sheet 21 with it. The extended margins 21a are preferably of a width corresponding to the thickness of the article and are drawn within the confines of the backer when the article is pushed through opening 23. In Step III portions 20a and 20b of the backer are secured together around article 21 and simultaneously securing sheet 21 between them. This may be done in several way. For example, the backer may be initially coated with heat sealable material and pressed between heated dies 27 and 28. The lower die has a cavity 29 to accommodate article 26, but this cavity need not be shaped to fit the particular article. A die with a rectangular cavity may be used for rectangular blanks with cut outs for articles of various shapes. Other types of adhesives or fasteners such as staples may be used instead, for securing the portions of the blank together.

The final Step IV consists of subjecting the package to heat to shrink the portion of the film 29 which is draped around the article. This may be conveniently done by placing the package in a chamber 30 and introducing hot air through nozzles 31 and 32. The film will shrink in a very short period. In shrinking, the film becomes closely and smoothly molded to the contour of the article, so that, in the finished package, the transparent portion has a smooth fitting appearance comparable to that of a pre-molded blister.

It is understood that the various steps of assembling the package and exposing it to a hot air blast or other suitable heating means may be performed manually or by automatic packaging machinery.

The blank of FIG. 4 consists of a rectangular backer 33 to which a sheet of the heat shrinkable film 34 is attached near one of the long edges by a strip of adhesive 35. The backer is scored along central line 36, dividing it into two portions 33a and 33b. The blank has mating openings 37 and 38 disposed at the same distance from line 36 in the two portions and shaped to the outline of the article. These openings are disposed to be brought into register when the blank is folded along the score line. The sheet 34 covers the entire backer and has margins 34a extending beyond the backer on the three unattached sides. These margins are of a width approximately equal to the depth of the article to be packaged. This blank is assembled around the article in substantially the same manner as the blank of FIG. 1. The article is placed over the opening in one of portions 33a, 33b, the blank is folded along its score line, the two portions are secured together around the article, and the package is subjected to heat. In this case the article projects through the openings on both sides of the package and is covered by the film on both sides.

The blank of FIG. 6 consists of a rectangular backer 40, and a sheet of heat shrinkable film 41 secured along one edge by adhesive 42. The backer is centrally scored along line 43 dividing it into two portions 40a and 40b, and has a central opening 44 of symmetrical shape extending into both portions. Each half of the opening to either side of line 43 corresponds to the outline of the article to be packaged. The sheet 41 is free along three of its sides and has margins 41a extending beyond the blank. This blank is assembled by folding it over the article, securing portions 40a and 40b together and applying heat to shrink the film, in the manner previously described. In the finished package, the article projects through both sides of the backer and is exposed along the folded edge.

FIG. 8 illustrates a pair of duplicate blanks each consisting of a backer 45 having an opening 46, and sheet 47 of heat shrinkable material attached to the backer along one margin by adhesive 48. These blanks are placed on each side of the article to be packaged, with their openings in register, secured together, and heated. The finished package appears substantially the same as that shown in FIG. 5.

The blank of FIG. 9 consists of a backer 50 scored to form two central panels 50a and 50b and four wing panels 50c, 50d, 50e, and 50f, and a sheet of heat shrinkable film 51 disposed over the central panels and secured by adhesive 52. Sheet 51 has margins 51a extending beyond the upper and lower edges of the blank. Panels 50a and 50b have openings 54 and 55, respectively, of a size and shape suitable for receiving the article to be packaged. Wing panels 50c, 50d, 50e, 50f are provided with openings 56, 57, 58, 59, respectively, of any desired size and shape.

To assemble a package from the blank of FIG. 6, the article is placed over the opening of one of the panels 50a, 50b and the blank folded flat about its central score line 60, causing the article, covered by the film 51, to project through openings 54 and 55. Panels 50a and 50b are secured together around the article in any suitable manner. The wing panels are then bent back to the configuration shown in FIG. 10 and the ends of the blank secured to panels 50a, 50b, near the fold line defined by line 60. The finished package is roughly a square, with a diagonal partition in which the article is disposed.

The film 51 is shrunk around the article by heating the package as previously described. The wing panels form bumpers for protecting the article from shock in transit or contact with other articles when a number of such packages are shipped or stored together in a larger container. Openings 56, 57, 58, 59 serve as windows for visual inspection of the article in its transparent wrapper.

In the blank shown in FIG. 12, the backer 61 is scored to form central panels 61a and 61b, and wing panels 61c and 61d joined to the central panels by relatively narrow connecting panels 61e and 61f. A sheet of heat shrinkable film 62 overlies the central panels and has margins 62a extending beyond the upper and lower edges of the backer. Panels 61a and 61b have openings 63 and 64, respectively of a suitable size and shape for receiving the article to be packaged, and panels 61c and 61d have openings 65 and 66 respectively, which may be of any desired size and shape.

To assemble a package from the blank of FIG. 12, the article to be packaged is placed over one of the openings 63, 64 and the blank folded along its center score line 67, to bring panels 61a and 61b flat together. The panels are secured together around the article. Panels 61c, 61d, 61e, and 61f are then bent to the configuration shown in FIG. 13, that is roughly triangular, with panels 61e and 61f extending outward from a central wall formed by panels 61a and 61b, and panels 61c and 61d extending obliquely downward. The two latter panels are secured at their lower ends to panels 61a, 61b near fold line 67 for example, by staples 68. Panels 61c and 61d protect the article and windows 55 and 66 to permit visual inspection.

In all the forms of packages here disclosed, the "blister" portion may be made of very thin film, because the film is not mechanically stressed by molding, stretching or otherwise manipulating it except for the very slight stress occasioned by pushing the loosely held sheet through the opening in the backer along with the article. Films of .25 mil to 1 mil thickness may be successfully used. The final shrinking step requires relatively little heat. The temperature and dwell time in the heat chamber or other heating device, vary according to the thickness and material from which the film is made. The shrinking temperature may vary from 210° to 300° F. and the dwell time from .1 to .7 second for films in the thickness range described above. The optimum conditions for achieving complete and rapid shrinkage of the film may be readily determined by trial of a few samples of the particular film used in a package. By way of example, a package using polyvinyl chloride biaxially orientated film .4 mil thick may be satisfactorily shrunk at 230° F. in about .4 second.

The new method permits the use of thin film for forming a blister compared to a sheet of two to four mills thickness used for making a premolded blister, resulting in a considerable saving in cost of material.

The cost of special dies for each type of package, and the shut-down time required for changing dies on automatic or semiautomatic packaging machinery are eliminated. This method therefore makes it possible to produce a blister type of package at a cost considerably lower than that of pre-formed or pre-molded blister packages.

What is claimed is:

1. The method of packaging an article which comprises disposing the article between two portions of a backer having an opening covered by a sheet of thin heat-shrinkable material, pushing said article along with a portion of said sheet in substantially unstressed condition through said opening, securing said backer portions together around said article with said sheet between them, and applying heat to said sheet portion to shrink said sheet portion to approximately the contour of said article.

2. The method of packaging an article which comprises forming a backer blank of relatively stiff material with an opening, loosely disposing a sheet of thin heat-shrinkable material over said opening, placing the article over said sheet and opening, folding the blank to bring portions thereof into face to face relationship around said opening with said sheet between them, thereby pushing said article along with a portion of said film in substantially unstressed condition through said opening, securing said face to face portions together around said opening, and applying heat to said sheet to shrink said sheet portion around said article.

3. The method of packaging an article which comprises disposing said article between two portions of a backer having an opening loosely covered by a sheet of biaxially oriented heat-shrinkable film of a thickness in the range .25 mil to 1 mil, pushing said article along with a portion of said sheet in substantially unstressed conidtion through said opening, securing said backer portions together around said opening with said sheet between them, and heating said sheet to a temperature in the range 210° to 300° F. for a time period in the range .1 to .7 second.

References Cited by the Examiner

UNITED STATES PATENTS

| 2,855,735 | 10/58 | Groth | 53—30 |
|---|---|---|---|
| 2,874,836 | 2/59 | Wertepny | 2—59 |
| 2,904,943 | 9/59 | Dreyfus | 53—30 |
| 2,950,004 | 8/60 | Acomb | 206—78 |
| 3,018,879 | 1/62 | Crane | 53—30 |
| 3,053,023 | 9/62 | Watts | 53—30 |
| 3,064,402 | 11/62 | Crane | 53—30 |

FOREIGN PATENTS 141,419   6/51   Australia.

OTHER REFERENCES

See-Through Card Pack, Modern Packaging, March 1959, pp. 84–85.

FRANK E. BAILEY, *Primary Examiner*.

J. DRUMMOND, ROBERT A. LEIGHEY,
*Examiners.*